July 28, 1942.  W. LEATHERS  2,291,338
ROTARY CIRCUIT MAKER AND BREAKER
Original Filed Aug. 2, 1940
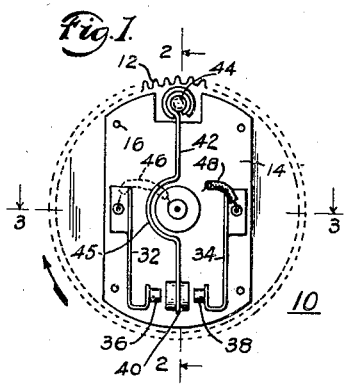
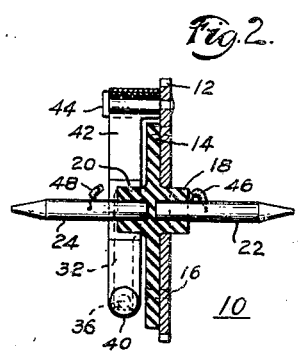
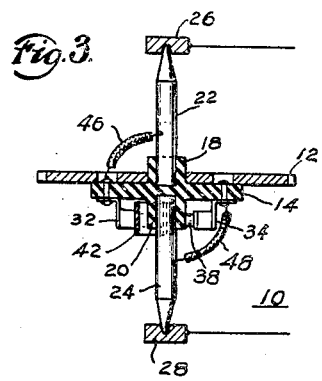
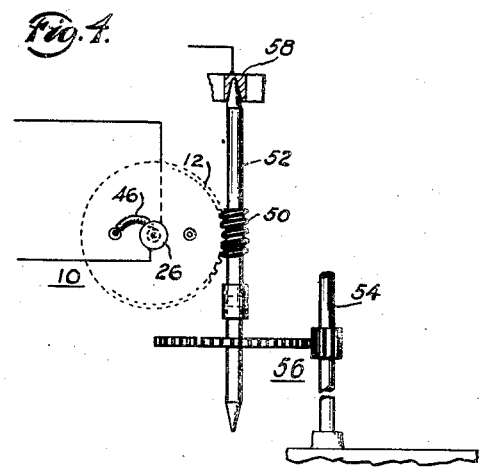
INVENTOR
Ward Leathers
BY
ATTORNEY Patented July 28, 1942

2,291,338

UNITED STATES PATENT OFFICE 2,291,338

ROTARY CIRCUIT MAKER AND BREAKER

Ward Leathers, Brooklyn, N. Y., assignor to International Business Machines Corporation, New York, N. Y., a corporation of New York Original application August 2, 1940, Serial No. 349,978. Divided and this application April 18, 1942, Serial No. 439,542

6 Claims. (Cl. 200—19)

The present invention relates to circuit makers and breakers and more particularly to an automatically operable rotary circuit maker and breaker in which the action of gravity is employed for the actual circuit making and breaking functions and which requires very little energy for its operation, thus rendering the device useful in connection with delicate and sensitive mechanisms which operate at extremely low power levels.

The improved circuit maker and breaker comprising the present invention is designed primarily for use in connection with electric watt-hour meters and other meters which employ step-by-step cyclometer type indicating devices wnerein digital indicia are caused to periodically and successively appear to view to indicate or register the amount of the metered commodity which has been consumed. The cyclometer registering mechanisms associated with meters of this type are either of the disc or barrel type and in either instance the periodic distribution of electric current required for the operation of these mechanisms offers a measure of frictional resistance to the free rotation of the meter armature-disc or the motivating shaft of the meter gearing. While this periodic application of a counter-torque to the rotary meter shaft involves only a very slight expenditure of power at each impulse, such misapplied power impulses are nevertheless cumulative and in time affect the normal meter indication to the detriment of the public utility company to whom the erroneous meter indication represents an actual loss in dollars and cents. Furthermore, because of the fact that the meter armature-disc, in the case of electrical meters, is operated at extremely low power levels, the current distribution device associated with the armature-disc or the shaft upon which it is carried will, if any appreciable amount of counter-torque is involved, periodically place a very heavy drain upon the motivating torque and retard the rate of turning movement of the disc to such an extent that frictional coefficients are magnified in the various bearings and between the various meeting surfaces of the moving parts of the meter, all of which by a process of cumulation will seriously affect the meter indication over a period of time.

Heretofore, current distribution switches which have been employed for the purpose of cyclometer operation, and which have derived their motivating power from the meter mechanism itself, have been dependent upon periodic current interruptions in a single electric circuit operable upon opening or closing of the circuit to impulse or advance the cyclometer mechanism. Such circuit making and breaking mechanism, in addition to the relatively heavy frictional load which it places upon the moving parts of the meter, is disadvantageous in that normal current interruption in the circuit arising from external considerations will serve to advance the cyclometer mechanism.

In my copending application, Serial No. 349,978, filed August 2, 1940, there is disclosed a meter cyclometer and actuating apparatus therefor which is designed to overcome the above noted limitations that are attendant upon the use of meters of the cyclometer type. Briefly, this apparatus includes an actuating solenoid for the cyclometer mechanism and a holding solenoid for the latter solenoid, together with circuits for each solenoid. The holding solenoid is adapted to retain the actuating solenoid in an inoperative position after the application of each stepping impulse to the cyclometer so that any interruption of the current supply or resumption thereof will not cause actuation or impulsing of the cyclometer mechanism. Means in the form of a current distribution switch, operable upon movement of the armature-disc of the meter, distributes current alternately to the two solenoids causing in one instance a step-up of the cyclometer mechanism and in the other instance holding or locking of the cyclometer actuating mechanism until such time as a further impulse is immediately impending.

This application is a division of my copending application above referred to and is concerned with the provision of a rotary circuit maker and breaker which may be driven directly from the shaft upon which the meter armature is mounted or from any other moving part of the meter and which upon rotation thereof will place a practically negligible power drain upon the meter.

Yet another object of the invention is to provide a rotary current distribution switch of the character set forth above, having a movable contact-shifting arm which is balanced relative to the center of gravity of the rotary switch and which, in performing its circuit making and breaking functions, is possessed of a relatively slight degree of movement whereby the entire unit is at all times maintained in a position of substantially stable equilibrium.

The provision of a rotary circuit maker and breaker, which is extremely simple in its construction; one which is possessed of a minimum number of moving parts and which, therefore, is unlikely to get out of order; one which is rugged and durable, and one which may be manufactured at a small cost, are further desirable features that have been borne in mind in the production and development of the present invention.

Other objects and advantages of the invention, not at this time more particularly enumerated, will become more readily apparent as the nature of the invention is better understood.

In the accompanying single sheet of drawings, one embodiment of the invention has been illustrated. In the drawing:

Figure 1 is a front elevational view of rotary circuit maker and breaker constructed in accordance with the principles of the invention.

Figure 2 is a side sectional view taken substantially along the line 2—2 of Figure 1.

Figure 3 is a top sectional view taken substantially along the line 3—3 of Figure 1.

Figure 4 is a fragmentary plan view illustrating the manner in which the improved circuit maker and breaker is applied to a meter construction and showing the same operatively associated with a meter armature-disc.

Referring now to the drawing in detail, the improved rotary circuit maker and breaker unit is designated in its entirety at 10 and involves in its general organization a toothed disc 12 of conductive metal and a plate 14 of insulating material, the two parts being connected together in any suitable manner, as, for example, by means of rivets 16 or the like. The plate 14 is formed with a pair of coaxial oppositely extending bosses 18 and 20, the former boss projecting completely through the disc 12. Frictionally received within the bosses 18 and 20 are a pair of aligned supporting shafts 22 and 24, the outer ends of which are rotatively journalled in metallic bearings 26 and 28 respectively. The shafts 22 and 24 are likewise formed of conductive metal and each shaft makes electrical contact with its respective metallic bearing at the outer end thereof.

Suitably secured to the insulated plate 14 by means of rivets 30 or the like, are a pair of spring contact arms 32 and 34 respectively each carrying at its free end a contact, which contacts are designated at 36 and 38 respectively. The contacts 36 and 38 extend inwardly toward each other and are adapted to be alternately engaged by a contact 40 carried at the free end of an arm 42, the other end of which is pivotally connected to a stud 44 secured to the disc 12 adjacent the periphery of the latter. The arms 32, 34 and 42 are formed of conducting material and the latter arm 42 is electrically connected through its pivotal connection with the disc 12. The arm 42 is substantially diametrically disposed with respect to the disc 12 and the medial region of the arm is curved as at 45 to avoid contact of the arm with the central hub 20 or the shaft 24. A conductor 46 serves to electrically connect the shaft 22 to the arm 32 while a similar conductor 48 serves to electrically connect the shaft 24 with the arm 34.

From the above description of parts it will be seen that the shafts 22 and 24 in effect constitute electrical terminals for the contacts 36 and 38 respectively, whereas the disc 12 in effect constitutes an electrical circuit common for the two circuits afforded by the contacts 36 and 38. Thus, when the unit 10 is employed in a meter construction the toothed disc 12 may be driven through a worm 50 carried on an intermediate shaft 52, which is in turn driven by the armature shaft 54 of the meter through a spur and pinion connection, generally characterized by the numeral 56. The bearings 26 and 28 may constitute terminal connections for each of the two circuits involved while a bearing 58, which makes electrical contact with the shaft 52, may constitute a common terminal connection for the two circuits.

The specific character of the two circuits which are controlled by alternate engagement of the contacts 36 and 38 by the contact 40 forms no part of the present invention and no claim is made herein to any novelty associated with the same. Such cyclometer controlling circuits and their functions have been illustrated and claimed in my copending application above referred to and reference may be had to this application for a full disclosure thereof.

In the operation of the circuit making and breaking unit the shafts 22 and 24 are disposed in a substantially horizontal position with the disc 12 occupying a position substantially in a vertical plane. With the unit thus oriented, when the pivot pin 44 is in its uppermost position, as shown in Figures 1 and 2, the arm 42 assumes a vertical position and the contact 40 remains out of engagement with either of the contacts 36 or 38. As the unit rotates in a clockwise direction, as indicated by the arrow in Figure 1, the arm 42, acting under the influence of gravity, is engaged by the contact 38 and a circuit is completed from the common terminal bearing 58 through the circuit maker to the terminal bearing 28. This circuit remains closed until such time as the pivot pin 44 has moved through an arc of substantially one hundred eighty degrees at which time the arm 42 momentarily assumes a degree of unstable equilibrium. The arm 42 is thus tilted in the direction of rotation of the unit so that the contact 40 moves out of engagement with the contact 38 and substantially immediately thereafter into engagement with the contact 36 carried by the arm 32. Movement of the arm 42 in this manner serves to open the previously closed circuit and to close the circuit leading from the terminal contact bearing 58 to the terminal contact bearing 26. This latter circuit remains closed throughout movement of the unit through an angle of substantially one hundred eighty degrees, after which time the cycle of operations just described is repeated.

It will be seen that because the arm 42, although secured to the disc 12 adjacent its periphery, extends substantially completely across the disc in diametrical fashion, an equal amount of mass is distributed on opposite sides of the disc so that the disc remains perfectly balanced regardless of its angular position. Thus a very slight amount of movement is permitted at the free end of the arm 42 in a circumferential direction, and as a consequence such movement does not materially affect the center of gravity of the unit as a whole. For this reason the unit is found to be useful, not only in connection with the sensitive armature-carrying shaft of an electric meter, but it is also useful in connection with various types of electrical measuring instruments and with certain sensitive clock driven mechanism controls wherein it is desired to distribute current to a plurality of circuits.

The invention is not to be limited to the exact arrangement of parts shown in the accompanying drawing or described in this specification since various changes in the details of construction may be resorted to without departing from the spirit of the invention. For example, while in the accompanying drawing there has been illustrated a circuit maker and breaker capable of closing a plurality of circuits, it is obvious that with suitable modification the apparatus may be employed for the intermittent interruption of a single electrical circuit. In such an instance, obviously one of the contacts 36 or 38 would be omitted and in its place a dummy contact, or simply an abutment post would be substituted to prevent the movable contact arm 42 from deviating appreciably from its diametrical position. Similarly, while electrical contact to the various parts of the unit is established through the bearings 26 and 28 and through the periphery of the disc 12 by direct surface contact with an adjacent driving worm 50, obviously other means may be employed for establishing the proper current application. Only insofar as the invention has particularly been pointed out in the accompanying claims is the same to be limited.

What is claimed is:

1. A rotary circuit maker and breaker comprising a rotary shaft including a pair of aligned shaft end-sections formed of conducting material, an insulating plate disposed at right angles to the shaft and extending between said shaft sections and maintaining the sections insulated from each other and in alignment, a disc formed of conducting material mounted on the plate, a pair of substantially fixed contacts mounted on the plate in opposed spaced relationship, a contact arm formed of conducting material pivoted to the disc and electrically connected thereto, said arm extending between said contacts and adapted to be moved relative to the latter by gravity upon rotation of the shaft and into alternate contact therewith, means electrically connecting one of said contacts to one shaft section, means for electrically connecting the other contact to the other shaft section, a contact bearing supporting each shaft section and in electrical engagement therewith, and a contact member in engagement with said disc.

2. A rotary circuit maker and breaker comprising a rotary shaft including a pair of aligned shaft end-sections formed of conducting material, an insulating plate disposed at right angles to the shaft and extending between said shaft sections and maintaining the sections insulated from each other and in alignment, a disc formed of conducting material mounted on the plate, a pair of substantially fixed contacts mounted on the plate in opposed spaced relationship, a contact arm formed of conducting material pivoted to the disc and electrically connected thereto, said arm extending between said contacts and adapted to be moved relative to the latter by gravity upon rotation of the shaft and into alternate contact therewith, means electrically connecting one of said contacts to one shaft section, means for electrically connecting the other contact to the other shaft section, an electrical take-off connection for each shaft section, and an electrical take-off connection for said disc.

3. A rotary circuit maker and breaker comprising a rotary shaft including a pair of aligned shaft end-sections formed of conducting material, an insulating plate disposed at right angles to the shaft and extending between said shaft sections and maintaining the sections insulated from each other and in alignment, a disc formed of conducting material mounted on the plate, a pair of substantially fixed contacts mounted on the plate in opposed spaced relationship, a contact arm formed of conducting material pivoted to the disc and electrically connected thereto, said arm extending between said contacts and adapted to be moved relative to the latter by gravity upon rotation of the shaft and into alternate contact therewith, means electrically connecting one of said contacts to one shaft section, means for electrically connecting the other contact to the other shaft section, an electrical take-off connection for each shaft section, and an electrical take-off connection for said disc, said latter take-off connection constituting a driving means for the disc.

4. A rotary electric circuit maker and breaker comprising a shaft including a pair of aligned end-sections formed of conducting material, an insulating plate disposed at right angles to the shaft and extending between said sections and maintaining said sections insulated from each other and in alignment, a gear formed of conducting material mounted on the plate and having peripheral teeth, a pair of substantially fixed contacts mounted on the plate in opposed space relationship, a contact arm pivotally and electrically connected to the gear, said arm extending between said contacts and adapted to be moved relative to the latter by gravity and into alternate contact therewith, means electrically connecting one of said contacts to one shaft section, means electrically connecting the other contact to the other shaft section, a contact bearing for each shaft section, and means meshing with the teeth of said gear for rotating the latter and for establishing electrical contact therewith.

5. A rotary circuit maker and breaker comprising a shaft formed of conductive material, a disc secured to said shaft and disposed at right angles thereto, an insulating plate secured to said disc, a fixed contact mounted on said plate, a contact arm formed of conducting material pivotally and electrically connected to the disc, said arm being movable by the action of gravity into and out of engagement with said contact upon rotation of the shaft and disc, means electrically connecting said contact and shaft, and means for establishing electrical contact with the disc.

6. A rotary circuit maker and breaker comprising a pair of opposed aligned contact bearings adapted to the alternately connected electrical circuit, a shaft rotatably mounted in and suspended by said bearings, said shaft including a pair of aligned shaft end-sections formed of conducting material, an insulating plate disposed at right angles to the shaft and extending between said sections and maintaining the sections in alignment, a disc formed of conducting material mounted on the plate, a pair of substantially fixed contacts mounted on the plate in the peripheral regions of the latter in opposed space relationship, a contact arm formed of conducting material pivoted to the disc adjacent its periphery at a point diametrically opposite the region of said contacts, said contact arm being electrically connected to the disc, said arm extending across the disc in substantially diametrical relationship with respect thereto and projecting between said contacts, and adapted to be moved relative to the latter by gravity and into alternate contact therewith, means electrically connecting one of said contacts to one shaft section, means for electrically connecting the other contact to the other shaft section, and means engaging said disc in driving relationship and establishing electrical contact therewith.

WARD LEATHERS.